United States Patent [19]

Brodie

[11] Patent Number: 4,810,008
[45] Date of Patent: Mar. 7, 1989

[54] METHOD AND APPARATUS FOR REPAIRING LAWN SPRINKLER SYSTEMS

[76] Inventor: Scott Brodie, 355 - 13th St., Seal Beach, Calif. 90740

[21] Appl. No.: 64,409

[22] Filed: Jun. 22, 1987

[51] Int. Cl.[4] .................... F16L 41/00; F16L 47/00
[52] U.S. Cl. .................... 285/31; 285/156; 285/179; 285/226; 285/227; 285/235; 285/423; 285/915
[58] Field of Search ........... 285/156, 227, 226, 903, 285/235, 31, 423, 915

[56] References Cited

U.S. PATENT DOCUMENTS

| | | | |
|---|---|---|---|
| 2,406,234 | 8/1946 | Marancik et al. | 285/227 X |
| 3,695,643 | 10/1972 | Schmunk | 285/156 |
| 3,850,459 | 11/1974 | Blumenkranz et al. | 285/156 |
| 3,873,137 | 3/1975 | Yamaguchi | 285/226 |
| 3,970,334 | 7/1976 | Campbell | 285/226 X |
| 4,035,002 | 7/1977 | Curtin | 285/31 |
| 4,081,190 | 3/1978 | Itzler | 285/423 X |
| 4,099,744 | 7/1978 | Kutnyak et al. | 285/903 X |
| 4,314,717 | 2/1982 | Bjurman | 285/226 X |
| 4,350,372 | 9/1982 | Logsdon | 285/226 |
| 4,429,907 | 2/1984 | Timmons | 285/156 X |

FOREIGN PATENT DOCUMENTS

| | | | |
|---|---|---|---|
| 2353481 | 4/1975 | Fed. Rep. of Germany | 285/156 |
| 954788 | 12/1949 | France | 285/227 |
| 353520 | 7/1931 | United Kingdom | 285/226 |
| 1584365 | 2/1981 | United Kingdom | 285/156 |
| 2120341 | 11/1983 | United Kingdom | 285/226 |

Primary Examiner—Thomas F. Callaghan
Attorney, Agent, or Firm—Charles H. Thomas

[57] ABSTRACT

An improved lawn sprinkler fitting is provided for repairing leaks in lawn sprinkler systems and for replacing leaky components in such systems. The improved fitting of the invention is a tubular coupling having opposite annular ends formed with wall thicknesses which are sufficient to maintain the shape of predetermined circular openings therethrough. At least one intermediate annular corrugated section is disposed between the opposite ends and has a wall thickness less than the wall thickness of the opposite ends. The intermediate section is both longitudinally compressible and longitudinally extendible. The intermediate section of the coupling is compressed to allow the coupling to be inserted between exposed ends of buried lawn sprinkler pipe. A solvent type adhesive is applied to the exposed ends of the pipe and the intermediate section of the coupling is extended, thereby bringing the annular ends of the coupling into contact with the exposed ends of the buried pipe. Contact of the coupling ends with the exposed ends of the buried pipe effectuates solvent welding of the coupling ends to the exposed water pipe ends, thereby providing a leak proof seal.

10 Claims, 2 Drawing Sheets

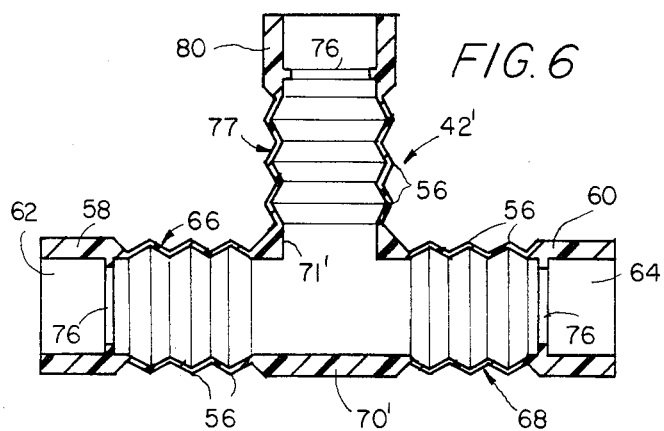
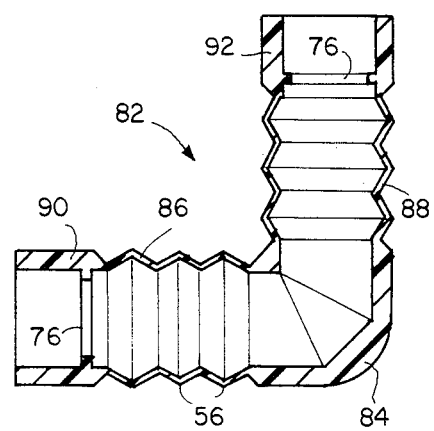
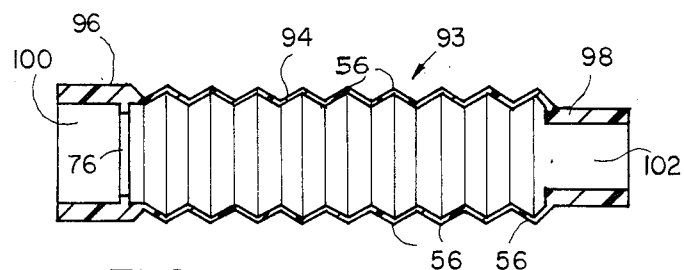
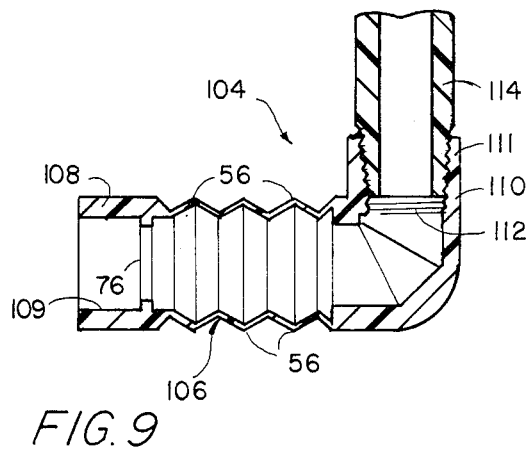
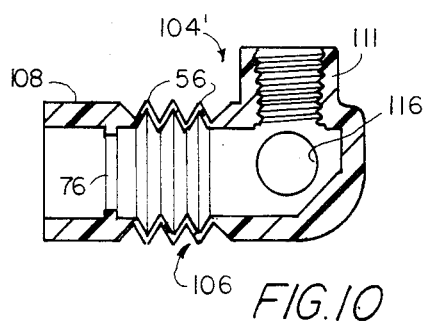

METHOD AND APPARATUS FOR REPAIRING LAWN SPRINKLER SYSTEMS

BACKGROUND OF THE INVENTION

1. Field of the Invention

The present invention relates to a method and apparatus for facilitating the repair of leaks in water lines, particularly, buried water sprinkler lines.

2. Description of the Prior Art

Presently, buried water sprinkler lines are widely employed as a means for watering lawns, flower beds, golf courses, plant seedlings, and for other applications. The conventional practice in installing buried water sprinkler systems is to bury lengths of water sprinkler pipe in a pattern emanating from a water supply, and to provide risers at spaced intervals. sprinkler heads are located at the risers to sprinkle water throughout predetermined areas. Conventional water sprinkler lines are typically buried at depths governed by climate extremes in the geographic area in which the sprinkler system is located and by surface activities which are likely to occur above the buried sprinkler lines. Water lines can be buried at a relatively shallow depths in climates which are not subject to freezing temperatures and at locations where the surface is likely to remain undisturbed. In contrast, sprinkler lines are buried much deeper at geographic locations which are subject to freezing and subfreezing temperatures, and beneath surfaces across which vehicles, such as tractors or lawn mowers are likely to travel.

While initially metal pipes were employed as the primary conduits in buried water sprinkler systems, modern sprinkler systems are constructed primarily of polyvinyl chloride piping, ducts and couplings. Polyvinyl chloride conduits and fittings are significantly cheaper to manufacture than are metal pipes, and are largely insensitive to substances in the soil which tend to corrode and degrade metal pipes.

Ideally, once a buried water sprinkler system is installed the buried conduits, pipes, fittings, risers, and sprinkler heads will remain undisturbed indefinitely. However, as a practical matter leaks do develop in buried water sprinkler lines for a number of different reasons. Such leaks are typically detected as a result of localized saturation of soil or due to observation of an unusually great consumption of water. When leaks in a water sprinkler system are detected, they must be repaired. If a leak occurs in a fitting or valve, the leaky fitting or valve must be removed and replaced. Alternatively, if a leak occurs at a location in a water pipe or duct, a section of the pipe or duct must be removed and replaced with a splice or coupling.

When leaks are detected in a buried water sprinkler system it is necessary to dig away soil from atop the water sprinkler line a considerable longitudinal distance along the piping in both directions from the source of the leak. The linear length of buried pipe line which must be exposed will vary depending upon the depth at which the pipe is buried, the nature of the soil, the looseness or compactness of the soil, and the extent to which the pipe line is accessible in both directions from the source of the leak along the buried water line. Nevertheless, the linear length of pipe which must be exposed is rarely less than about eight inches in both directions from the leaking section to be replaced and more typically is at least a foot in both directions. Moreover, to achieve the necessary exposure of the buried pipe line, excavation at the surface above the pipe must be performed over a considerably greater linear distance. Naturally, any plant or ground cover growth atop the length of buried water sprinkler line to be exposed must be destroyed. Thus, repair of an extremely localized leak in a buried water sprinkler line can involve the extensive destruction of substantial areas of a garden or lawn.

The reason that it is necessary to expose significant lengths of buried water pipe in both directions from the source of a leak is so that enough pipe is exposed so that the ends of the pipe in both directions from the source of the leak can be flexed sufficiently to allow a replacement fitting or a repair splice of fixed length to be inserted into the water line once the leaking fixture or the leaking portion of the pipe has been removed. In order for a replacement fitting or a splice to be inserted between exposed ends of a water line on either side of a leak, the replacement fitting or splice must be of a length greater than the distance of separation between the exposed ends of the water line so that the fitting or splice will more than span the distance of separation between the exposed ends. Some means of sealing, such as solvent welding is employed so that the overlapping ends of the replacement fitting or splice are securely joined to the exposed ends of the buried pipe on either side of a leak. However, in order for a replacement fitting or splice to be inserted in the line, the pipe must be flexed considerably to temporarily increase the distance of separation between the exposed pipe ends, so that the conventional, rigid replacement fittings or splices can be inserted therebetween.

One further disadvantage of the conventional technique for repairing leaks in lawn sprinkler repair lines is that the stress on the pipe which results from flexing the exposed lengths of pipe will often be transmitted along the length of the pipe and will result in a leak at a different location in the buried water sprinkler line. Thus, the conventional technique of repairing one leak in a water sprinkler line frequently results in creating a leak at a different location along the line.

A further disadvantage of the conventional buried water sprinkler line repair technique is that when the pipe is flexed and the replacement coupling or splice is inserted, the exposed end of the pipe and at least one end of the replacement fitting or splice must necessarily meet at a significant oblique angle, rather than in coaxial alignment. The exposed end of the pipe is thereby forced into an end of a replacement fitting or splice at some angle of displacement from the longitudinal axis of the replacement fitting or splice. This results in excessive manipulation between the exposed pipe end and the end of the replacement fitting or splice into which the exposed end of the pipe is inserted during curing of the solvent cement, so that the subsequent seal therebetween is more likely to leak.

SUMMARY OF THE INVENTION

The present invention provides a new method and device for effectuating repairs in a buried water sprinkler line. The improved system of the invention does not involve the disadvantages of the prior system of water sprinkler line repair, hereinbefore described. To the contrary, the system of the invention employs a fitting which can be compressed in length and extended in length to avoid excavating extensive lengths of pipe on either side of the leak. Also, the fitting of the invention can be installed without the necessity for obliquely inserting an exposed pipe end into one end of the fitting.

In one broad aspect the invention may be considered to be a fitting adapted for positioning in a water line comprising a unitary tubular coupling having opposite annular ends formed with wall thicknesses sufficient to maintain the shape of predetermined circular openings therethrough. The fitting of the invention also has at least one intermediate annular corrugated section disposed between the opposite ends of the fitting and having a wall thickness less than the wall thickness of the fitting ends, whereby the intermediate section is both longitudinally compressible and longitudinally extendible.

In another broad aspect the present invention may be considered to be an improvement in a unitary fitting adapted for positioning in a water line and having opposite annular ends formed with circular openings therethrough and with wall thicknesses at the fitting ends sufficient to maintain the circular configuration of the openings therein. The improvement of the invention is comprised of at least one intermediate annular corrugated section located between the opposite ends of the fitting and having a wall thickness reduced from the wall thicknesses of the opposite ends of the fitting. In this manner the intermediate section of the fitting is longitudinally compressible to draw the opposite ends toward each other and is longitudinally extendible to increase the longitudinal distance between the opposite ends.

In yet another broad aspect the invention may be considered to be a method of repairing a water line which includes removal of a defective section of the line from between a pair of longitudinally aligned duct sections. The improvement of the invention involves longitudinally compressing a unitary fitting having opposite annular ends formed with circular openings therethrough and with wall thicknesses sufficient to maintain the shape of the circular openings and having at least one intermediate section disposed between the opposite fitting ends and having a wall thickness less than the wall thicknesses of the fitting ends. The coupling is then inserted between the longitudinally aligned duct sections. The unitary fitting is then longitudinally extended to bring the fitting ends into contact with the duct sections. The fitting ends are then sealed to the duct sections.

One important feature of the invention is that the wall thicknesses of the ends of the fitting are great enough so that the openings at those ends are not deformed during the installation process. Because the wall thicknesses at the fitting ends are relatively great, the structure of the ends of the fittings is essentially rigid so that an exposed end of a pipe or conduit will not deform or collapse the end opening during insertion. Also, the relative rigidity of the coupling ends aids in ensuring a leakproof seal when the end is solvent welded to the exposed end of the pipe or duct. The thinner, intermediate section of the coupling is quite flexible so as to allow the distance of separation of the rigid coupling ends to be decreased to allow the coupling to be inserted between the exposed pipe ends, and increased to allow the coupling ends to overlap and capture the exposed end of the pipe line in intimate contact therewith.

Preferably, the coupling or fitting is formed of molded polyvinyl chloride so that it can be solvent welded to conventional polyvinyl chloride tubing which is utilized as lawn sprinkler pipe. Preferably also, the wall thicknesses of the opposite annular ends of the coupling or fitting are at least about 0.125 inches, typically between about 0.125 inches and about 0.5625 inches, while the wall thickness of the intermediate section is preferably no greater than about 0.125 inches and is typically between about 0.03125 inches and about 0.125 inches. If the coupling or fitting is formed with the ends and the intermediate section having the preferred relationship of thicknesses, the ends will retain their geometric configuration during installation, while the intermediate section can be compressed and extended as necessary in order to effectuate installation.

The invention may be described with greater clarity and particularity by reference to the accompanying drawings.

DESCRIPTION OF THE DRAWINGS

FIG. 6 is a sectional, elevational view illustrating yet another alternative embodiment of the fitting of the invention.

FIG. 7 is a sectional, elevational view illustrating still another alternative embodiment of the fitting of the invention.

FIG. 8 is a sectional, elevational view illustrating yet another alternative embodiment of the invention.

FIG. 9 is a sectional, elevational view illustrating still another alternative embodiment of the fitting of the invention with the intermediate section in an extended condition.

FIG. 10 is a sectional, elevational view of still another alternative embodiment of the fitting of the invention with the intermediate section in a compressed condition.

DESCRIPTION OF THE EMBODIMENTS

Figure 1:
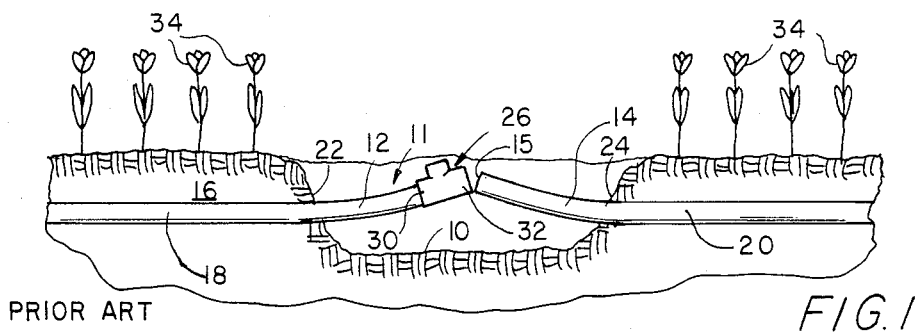
FIG. 1 is an elevational, diagrammatic view illustrating the prior art technique of repairing a leak in a buried system.

FIG. 1 illustrates the conventional prior art technique of repairing a leak in a buried water sprinkler line. Accordingly to conventional practice, the leak in the sprinkler line is first located and the soil thereabove is dug out for a considerable distance along the buried water sprinkler line 11 in both directions from the leak. In this connection an elongated trench 10 is excavated in both directions from the leak to expose considerable portions 12 and 14 of the pipe line 11 in which the leak occurs. Sections 12 and 14 of the water pipe line 11 within the trench 10 are thus freed from the lateral constraints of the soil 16. Beyond the trench 10 the lengths 18 and 20 of the water pipe line 11 remain laterally constrained and are immobilized from movement both longitudinally and laterally.

In a conventional method of repairing a leak in the water line 11 the defective element in the water line 11 is removed. The water line is severed at two locations within the trench 10 to remove a defective fitting or a burst or leaking section of pipe, thereby exposing severed ends of the water line 11, one of which is visible at 15 in FIG. 1. The severed ends of the water line reside in spaced separation from each other within the trench 10 along the alignment of the water line 11 in its undeformed condition. Once a leaky fitting or section of the pipe has been removed from the water line 11, the uncovered portions 12 and 14 of the buried water sprinkler line 11 project longitudinally in a cantilevered manner in the trench 10 from the end walls 22 and 24.

To repair the leak in the water line 11, a replacement fitting must be inserted into the water line 11 and must have a length greater than the distance of separation between the severed ends 15 of the water line 11. If the leak occurs as a leak in a tee, for example, a replacement tee, such as the tee 26 indicated in FIG. 1, is employed.

According to conventional practice in repairing a leak in a water line, the extremities of the uncovered portions 12 and 14 of the water line 11 are coated with a solvent adhesive and the replacement tee 26 is inserted onto one of the ends 15. The cantilevered portions 12 and 14 of the water line 11 are then flexed upwardly is depicted in FIG. 1 in order that the other end 15 may be inserted into the opposite end 32 of the replacement tee 26. Once the other end 15 of the portion 14 enters the socket defined within the end 32 of the replacement tee 26, the deflecting force may be removed from the portions 12 and 14 of the water line 11. However, because the severed end 15 of the portion 14 enters the end 32 of the replacement tee 26 at an oblique alignment relative thereto, and because there is a considerable manipulation of the pipe end 15 relative to the end 32 of the replacement tee 26, the seal which is formed between the end 15 of the pipe section 14 and the end 32 of the replacement tee 26 ma not be as sound as in an original installation. Consequently, this seal may be the source of leaks in the future.

It should be noted from FIG. 1 that the length of the trench 10 is rather considerable. Indeed, a trench several feet long must be excavated in order to expose sufficient portions 12 and 14 of the water line 11 to allow the resilient deflection depicted in FIG. 1. As a consequence, if a number of leaks exist a repairman must spend a considerable amount of time excavating trenches sufficiently long to expose portions of pipe which can be deflected upwardly to a sufficient extent. This adds considerably to the cost of repair. Moreover, the greater the length of the trench 10, the greater will be the destruction of plants in the vicinity of the leak. This destruction is indicated by the absence of flowers 34 at the site of the trench 10 in FIG. 1.

Figure 2:
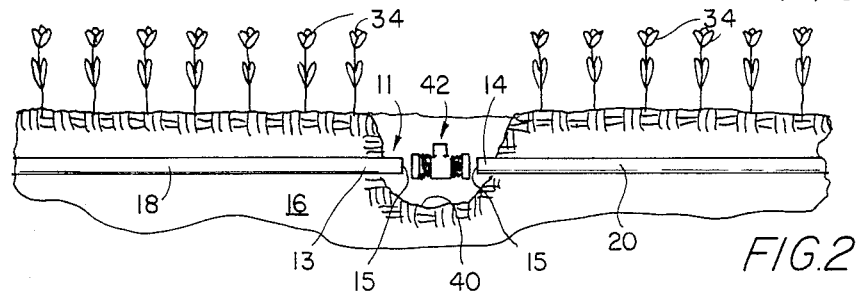
FIG. 2 is an elevational, diagrammatic view illustrating the improved method of sprinkler line leak repair according to the present invention.

In contrast, a trench 40 of much shorter length will suffice in order to effectuate necessary repairs to the water line 11 in accordance with the present invention, as depicted in FIG. 2. As depicted in FIG. 2, a replacement tee 42 of the invention may be employed in place of the conventional replacement tee 26 depicted in FIG. 1. The replacement tee 42 is illustrated in detail in FIG. 3

Figure 4:
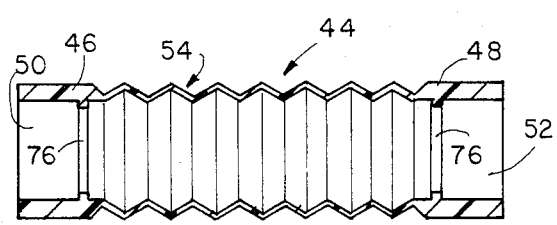
FIG. 4 a sectional, elevational view illustrating another embodiment of the fitting of the invention in an extended condition.
Figure 5:
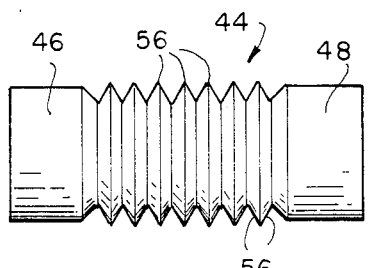
FIG. 5 is an elevational view of the fitting of FIG. 4 shown in a compressed condition.

FIGS. 4 and 5 illustrate one of the simplest embodiments of a fitting constructed according to the present invention. FIGS. 4 and 5 illustrate a unitary fitting 44 adapted for positioning in a water line. The fitting 44 is comprised of a unitary tubular coupling having opposite annular ends 46 and 48 formed with wall thicknesses sufficient to maintain the shape of predetermined circular openings 50 and 52 therethrough. The ends 46 and 48 have the same internal and external diameters, and the same wall thickness. The fitting 44 is further comprised of at least one intermediate corrugated section 54 which is disposed between the opposite ends 46 and 48 and which has a wall thickness less than the wall thicknesses of the ends 46 and 48, as illustrated in FIG. 4. The intermediate section 54 is both longitudinally compressible, as depicted in FIG. 5, and longitudinally extendible as depicted in FIG. 4.

As illustrated in FIGS. 4 and 5 the intermediate corrugated section 54 is comprised of a plurality of undulations or folds 56 which are longitudinally aligned and which create an accordion-like structure. When the intermediate section 54 is compressed, as depicted in FIG. 5, the folds 56 are pressed more closely together, thereby shortening the overall length of the fitting 44 and the distance between the openings 50 and 52 in the ends 46 and 48 of the fitting 44. When the fitting 44 is compressed as depicted in FIG. 5, it is relatively easy to insert the fitting 44 into a gap between the severed ends of a water line that is left when a leaking section or fitting has been removed. The intermediate section 54 may then be extended, as depicted in FIG. 4, so as to increase the longitudinal distance between the opposite ends 46 and 48. The ends 46 an 48 thereupon fit over the severed ends of the water line and may be firmly secured thereto in contact therewith by solvent welding.

Figure 3:
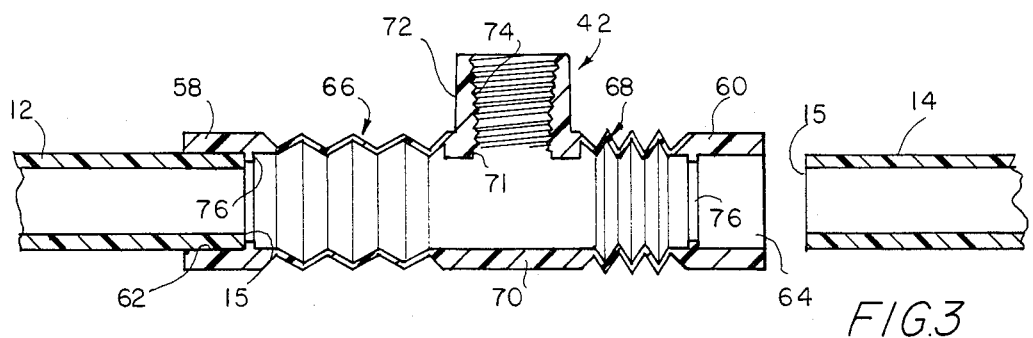
FIG. 3 is a sectional, elevational detail showing the embodiment of the fitting employed in FIG. 2 during an inter stage of installation.

FIG. 3 is a sectional elevational view showing installation of the tee fitting 42 of the invention which is utilized in place of a conventional tee fitting 26 depicted in FIG. 1. The improved tee fitting 42 according to the invention is a unitary tubular coupling formed of molded polyvinyl chloride and having opposite annular ends 58 and 60 with wall thicknesses sufficient to maintain the shape of predetermined circular openings therein indicated at 62 and 64, respectively. The wall thickness of the ends 58 and 60 is preferably between about 0.125 inches and about 0.5625 inches, although the appropriate thickness will depend upon the size of the openings 62 and 64 and the rigidity of the polyvinyl chloride plastic of which the fitting 42 is constructed.

The tee fitting 42 includes a pair of intermediate corrugated sections 66 and 68, both of which have wall thicknesses less than the wall thicknesses of the ends 58 and 60. The intermediate sections 66 and 68 are both longitudinally compressible and longitudinally extendible. The intermediate section 66 is illustrated in the extended condition, while the intermediate section 68 is illustrated in the compressed condition in FIG. 3. When the tee fitting 42 is constructed of polyvinyl chloride, the wall thickness of the intermediate sections 66 and 68 is preferably no greater than about 0.125 inches.

The tee fitting 42 is also comprised of a body section 70 which is located between the opposite ends 58 and 60. The body section 70 has a wall thickness greater than the wall thicknesses of the intermediate sections 66 and 68. Preferably, the wall thickness of the body section 70 is the same as that of the ends 58 and 60. The intermediate section 66 is disposed between the body section 70 and the end 58, while the intermediate section 68 is disposed between section 70 and the other opposite end 60. As illustrated in FIG. 3, the body section 70 forms a tee with a side opening 71 and wherein the opposite ends 58 and 60 of the fitting 42 are longitudinally aligned. A side opening sleeve 72 extends laterally from the body section 70 at the side opening 71. The side opening sleeve 72 is internally threaded at 74 to receive an externally threaded water conduit in threaded engagement therewith.

FIG. 2 illustrates a method of repairing a water line 11, which, like the prior art method of FIG. 1, involves the removal of a defective section of the line from between a pair of longitudinally aligned duct sections. According to the improved method of the invention, the intermediate sections 66 and 68 of the unitary tee fitting 42 are compressed so that the ends 58 and 60 of the fitting 42 will fit between the severed ends 15 of the exposed pipe sections 12 and 14 in longitudinal alignment therewith. It should be noted that no deflection of the exposed portions 12 and 14 of the water line 11 is necessary in carrying out the method of the invention. Since the water line 11 and the tee fitting 42 are both constructed of polyvinyl chloride plastic, a conventional polyvinyl chloride solvent adhesive is applied to the extremities of the exposed portions 12 and 14 of the water line 11. The intermediate sections 66 and 68 of the tee fitting 42 are then extended to bring the interior surfaces of the ends 58 and 60 into contact with the exterior surfaces of the exposed portions 12 and 14 of the water line 11. FIG. 3 illustrates the intermediate section 66 in an extended condition, whereby the end 58 resides in intimate contact with the outer surface of the extremity of one of the exposed portions 15 of the pipe line 11. Extension of the intermediate section 66 is limited by the stop ring 76 in the end 58. Stop rings 76 are provided to limit the extent of overlap of fittings or couplings with lengths of pipe in the construction of water sprinkler systems. The solvent adhesive applied to the exterior surface of the extremity of exposed portion 12 of the water line 11 quickly creates a liquid tight seal between the exposed portion 12 and the end 58 of the tee fitting 42.

In FIG. 3 the intermediate sections 66 is illustrated still in a compressed or retracted condition, as it would be when the tee fitting 42 is inserted in line with the exposed portions 12 and 14 to be joined. It is to be understood, however, that the intermediate section 66 is then extended in the same manner as the intermediate section 66 to effectuate a liquid tight seal with the exposed portion 14 of the water line 11.

Fittings according to the invention may be constructed in various geometric configurations. FIG. 6 illustrates a tee fitting 42' which is a variation of the tee fitting 42 depicted in FIG. 3, with common elements designated by the same reference numbers. The body section 70' of the tee fitting 42' likewise forms a tee and the opposite ends 58 and 60 of the fitting 42' are longitudinally aligned, as in the tee fitting 42. However, the tee fitting 42' is further comprised of a third intermediate section 77, which is of the same construction as the first and second intermediate sections 66 and 68. The third intermediate section 77 is joined to the body section 70' at a side opening 71 therein. The tee fitting 42' also includes a further end fitting 80 which has a wall thickness greater than that of the intermediate sections 66, 68 and 77. The wall thickness of the further end fitting 80 is sufficient to maintain the shape of a circular opening therethrough.

FIG. 7 illustrates another embodiment of the invention in which the fitting 82 defines a ninety degree elbow. The fitting 82 also includes a body section 84 which has a wall thickness greater than adjoining intermediate sections 86 and 88. The intermediate sections 86 and 88 are both annular and corrugated and have wall thicknesses less than the end sections 90 and 92 at which the intermediate sections 86 and 88 respectively terminate.

FIG. 8 illustrates another embodiment of the invention in which a fitting 93 is comprised of but a single collapsible and extendible intermediate section 94 having a wall thickness less than the wall thickness of the ends 96 and 98. Unlike the ends of the coupling 44, depicted in FIGS. 4 and 5, the ends 96 and 98 define circular openings of different diameters. The wall thicknesses of both of the ends 96 and 98 are each greater than the wall thickness of the intermediate section 94. The end 96 defines a circular opening 100 of diameter greater than the circular opening 102 formed by the end 98. The end 96 thereby serves as a female connecting element and the end 98 which defines the opening 102 of lesser diameter serves as a male connecting element.

FIG. 9 illustrates another elbow shaped fitting 104 according to the invention. Unlike the fitting 82 depicted in FIG. 7, the elbow shaped fitting 104 includes a single intermediate section 106 located between end sections 108 and 110. The end section 108 defines a circular opening having a smooth interior wall 109, while the circular opening at the outlet 111 of the end 110 is internally threaded at 112 to receive an externally threaded water conduit 114 in threaded engagement therewithin.

FIG. 10 illustrates a further embodiment of the invention and depicts a fitting 104' similar in many respects to the fitting 104 depicted in FIG. 9. The fitting 104' differs from the fitting 104 only in that it includes a side outlet 116, as well as the threaded outlet 111. The intermediate section 106 of the fitting 104' is illustrated in the compressed condition in FIG. 10, while the intermediate section 106 of the fitting 104 is illustrated in the extended condition in FIG. 9. However, it is to be understood that both of the intermediate sections 106, like the intermediate sections of the other embodiments, are both compressible as depicted in FIG. 10, and extendible as depicted in FIG. 9.

The invention has been described with particular reference to buried water lines, wherein couplings or fittings must be inserted between pipe sections which are longitudinally aligned and which cannot be readily shifted longitudinally relative to each other.

A further advantage of the invention is that the corrugated folds which are present in all embodiments, help protect a water line from breaking when the water line experiences an earthquake or other earth movement. Under such conditions the corrugated folds will flex and expand or contract as necessary and thereby prevent the water line from breaking.

Since numerous other variations and modifications of the invention will become readily apparent to those familiar with the repair of leaks in existing installations of water distribution systems, the invention should not be construed as limited to the specific embodiments and implementations depicted and described in connection with the drawing figures, but rather is defined in the claims appended hereto.

I claim:

1. A replacement fitting formed of molded polyvinyl chloride and adapted for positioning in a buried lawn sprinkler water line comprising:
 a unitary tubular coupling having opposite annular ends with predetermined circular openings therein and formed with wall thicknesses of at least about 0.125 inches, and at least one intermediate annular corrugated section having a plurality of folds disposed between said opposite ends and having a wall thickness of no greater than about 0.125 inches and less than the wall thicknesses of said opposite ends, and stop rings defining annular bearing surfaces formed at each of said opposite ends to limit the extent of overlap of said annular ends with pipes engaged in abutment against said annular bearing surfaces and in coaxial alignment with said annular ends, whereby said intermediate section is both longitudinally compressible and longitudinally extendible and whereby said opposite annular ends are rigid relative to said intermediate section so as to maintain the shape of said predetermined circular openings.

2. A fitting according to claim 1 further characterized in that said opposite annular ends of said coupling define circular openings of equal diameter.

3. A fitting according to claim 2 wherein said opposite ends are adapted to receive ends of duct sections of said water line internally therewithin and said stop rings are formed internally within each of said opposite annular ends.

4. A fitting according to claim 1 wherein said fitting is further comprised of a body section located between said opposite ends and having a wall thickness greater than said wall thickness of said intermediate section.

5. A fitting according to claim 4 wherein said body section defines an elbow at one of said opposite ends and is internally threaded to receive an externally threaded water conduit in threaded engagement therewithin.

6. A fitting according to claim 4 wherein said fitting is comprised of at least two intermediate sections as aforesaid, one of which is disposed between said body section and one of said opposite ends and the other of which is disposed between said body section and the other of said opposite ends.

7. A fitting according to claim 6 wherein said body section defines an elbow.

8. A fitting according to claim 6 wherein said body section forms a tee and said opposite ends of said fitting are longitudinally aligned with each other and a side opening is defined in said body section and is internally threaded to receive an externally threaded water conduit in threaded engagement therewith.

9. A fitting according to claim 6 wherein said body section forms a T with a side opening therein and said opposite ends of said fitting are longitudinally aligned with each other and further comprising a third intermediate section as aforesaid connected to said body section at said side opening therein, and a further fitting end with a predetermined circular opening therein formed on said third intermediate section remote from said side opening and having a wall thickness of at least about 0.125 inches and greater than that of said intermediate sections, and further formed with a stop ring at said further fitting end defining a further bearing surface to limit the extent of overlap of said further end with a pipe engaged in abutment against said further annular bearing surface, whereby said wall thickness of said further end is sufficiently rigid relative to said third intermediate section so as to maintain the shape of said circular opening defined therein.

10. In a unitary buried lawn sprinkler water line repair fitting formed of molded polyvinyl chloride and adapted for positioning in a water line and having opposite annular ends formed with predetermined circular openings therein and with wall thicknesses of at least about 0.125 inches, the improvement comprising a stop ring defining an annular bearing surface formed on each of said opposite annular ends to limit the extent of overlap of said annular ends with pipes in abutment against said annular bearing surfaces and in coaxial alignment with said opposite annular ends, and at least one intermediate annular corrugated section located between said opposite ends and having a wall thickness no greater than about 0.125 inches and reduced from the wall thicknesses of said opposite ends, whereby each of said intermediate sections is longitudinally compressible to draw said opposite ends toward each other and is also longitudinally extendible to increase the longitudinal distance between said opposite ends, and wherein said opposite annular ends formed with said stop rings maintain the circular configurations of the aforesaid circular openings.

* * * * *